Patented May 30, 1950

2,509,386

UNITED STATES PATENT OFFICE 2,509,386

DIBENZOPYRAN MARIHUANA-LIKE COMPOUNDS

Roger Adams, Urbana, Ill.

No Drawing. Application June 19, 1945,
Serial No. 600,414

9 Claims. (Cl. 260—333)

This invention relates to compounds having therapeutic activity and, more specifically, to derivatives of dibenzopyran having marihuana activity, which may be useful in the elimination of suffering from various ailments and particularly suffering by patients undergoing treatment for addiction to opium alkaloids.

Synthetic compounds with the alicyclic double bond as part of the pyran ring have been studied and shown to possess marihuana-like activity. These have the formula:

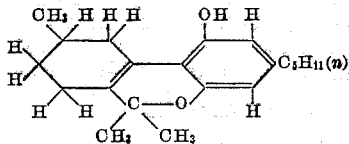

A variety of compounds with other normal alkyl groups in place of the n-amyl also were physiologically active.

It has now been found that compounds having certain branched-chain hydrocarbon groups in the 3 position instead of normal alkyl groups have much greater pharmacological and therapeutic activity. The hydroxyl group on the 1 position may be replaced with alkoxy or acyloxy, and other alkyl groups may be substituted for the methyl group at positions 6 and 9, while still retaining marihuana activity.

The general procedure for preparation of these pyrans is as follows: a 3,5-dimethoxyphenyl alkyl ketone is treated with an alkyl magnesium halide to form a 3,5-dimethoxyphenyl dialkyl carbinol. The carbinol is distilled with a few drops of sulfuric acid, which converts it into a corresponding alkene. The alkene is hydrogenated with hydrogen in the presence of a catalyst to form the 3,5-dimethoxyphenyl alkane. The alkane is then demethylated with hydrobromic acid to form the 3,5-dihydroxyphenyl alkane.

These 5-secondary-alkyl resorcinols are condensed with an alkyl 5-methyl-cyclohexanone-2-carboxylate to form 1-hydroxy-3-alkyl-9-methyl-7,8,9,10 - tetrahydro - 6 - dibenzopyrones. The pyrones are converted to the corresponding pyrans by the action of an alkyl magnesium halide.

In the following examples, selected to illustrate the invention, the following customary abbreviations are used; $n_D^{25}$ is the index of refraction for the D sodium line; $d_4^{25}$ is the density at 25° C. compared with that of water at 4° C.; temperatures are in degrees centigrade; yields are in percent of the theoretical amounts; reduced pressures (e. g. 2 mm.) are in millimeters of mercury; g. indicates grams; cc. indicates cubic centimeters.

EXAMPLE I

1-HYDROXY-3-(1-METHYLHEXYL)-6,6,9-TRIMETHYL-7,8,9,10-TETRAHYDRO-6-DIBENZOPYRAN

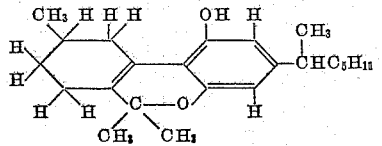

Step A

2 - (3,5 - dimethoxyphenyl) - 2 - heptene.—A Grignard reagent was prepared from 2.65 g. (0.109 atoms) of magnesium and 15.5 g. (0.109 moles) of methyl iodide in 60 cc. of anhydrous ether. The reaction was carried out in a round bottomed flask fitted with a reflux condenser. Twenty-five and eight tenths grams (0.109 moles) of 3,5-dimethoxyphenyl n-amyl ketone dissolved in 120 cc. of ether was added gradually. The reaction mixture was refluxed for one hour. The solution was cooled and a saturated solution of ammonium chloride in water was added dropwise with stirring. When the solution clarified, the decomposition was complete. The ethereal solution was removed and the aqueous portion washed with ether, and the washings joined with the original ether layer. After drying with calcium chloride, the ether was removed by distillation to obtain the carbinol.

Step B

The crude carbinol was placed in a flask for distillation and six drops of 20 per cent sulfuric acid was added. The liquid was then heated to boiling under reduced pressure until all of the water had been driven off, then the pure heptene was collected at a temperature of 149–159° (3.5 mm.); $n_D^{25}$ 1.5247, $d_4^{25}$ 0.9864. The yield was 87%.

Step C

2 - (3,5 - dimethoxyphenyl) - heptane. — Ten and fifty-five one-hundredths grams (0.045 moles) of the above heptene was dissolved in 100 cc. of 95% alcohol and subjected to hydrogenation with Raney nickel catalyst at room temperatures and 2–3 atm. of pressure. It boiled at 135–137.5° (3mm.) as a colorless liquid; $n_D^{25}$ 1.4998; $d_4^{25}$ 0.9654. The yield was 8 g. or 75%.

Step D 5-(1-methylhexyl)-resorcinol.—Seven and six tenths grams of the above heptane was demethylated by refluxing for five hours in a solution of 18 cc. of 48 per cent hydrobromic acid and 53 cc. of glacial acetic acid. The reaction mixture was poured into about 400 g. of ice-water mixture and extracted with three portions of ether. The ether extracts were neutralized with sodium bicarbonate solution and then extracted with a 10 per cent sodium hydroxide solution. The alkaline extracts were made acidic to Congo red paper with concentrated hydrochloric acid and again extracted with three portions of ether. After drying the solution over anhydrous sodium sulfate, the solvent was removed by distillation and the product was distilled under reduced pressure. It boiled at 168.5–170° (2 mm.) as a yellow syrup. The yield was 4.5 g. or 67%.

Step E

1 - hydroxy - 3 - (1 - methylhexyl) - 9 - methyl-7, 8, 9, 10-tetrahydro-6-dibenzopyrone.—Four and four tenths grams (0.021 moles) of the above resorcinol, 4 g. of ethyl 5-methylcyclohexanone-2-carboxylate, and 2.5 g. of phosphorus oxychloride were dissolved in 30 cc. of anhydrous benzene and refluxed for five hours. The solution was poured into about 100 g. of ice water and sodium bicarbonate was added until all the acid was neutralized. The benzene was removed by blowing a current of air over the solution, leaving a solid product. This was purified by recrystallization from ethyl acetate, white prisms, M. P. 144.5–145° (corr.). The yield was 3.26 g. or 47%.

Step F 1-hydroxy-3-(1-methylhexyl)-6, 6, 9-trimethyl-7, 8, 9, 10-tetrahydro-6-dibenzopyran.—Three and fifteen one-hundredths grams (0.010 moles) of the above pyrone was added in small portions to a Grignard reagent prepared from 2.8 g. of magnesium and 16.3 g. of methyl iodide (0.115 moles), in 60 cc. of anhydrous ether. An equal volume of benzene was added, the ether distilled off and the mixture refluxed for eighteen hours. The Grignard compound was decomposed with 120 g. of crushed ice containing 15 cc. of concentrated sulfuric acid. The aqueous layer was extracted with ether which was joined to the benzene portion. The solvent was removed by blowing a current of air over the solution, and a purple residue remained. This was dissolved in 50 cc. of 95 per cent alcohol and refluxed for ten hours with about 1 g. of Darco (decolorizing carbon). After removing the Darco and the solvent, the product was distilled. It boiled at 208–213° (2 mm.). The yield was 2.43 g. or 74%, of brown resin.

EXAMPLE II

1-HYDROXY - 3 - (1 - METHYLPENTYL) - 6,6,9 - TRIMETHYL-7,8,9,10-TETRAHYDRO-6-DIBENZOPYRAN

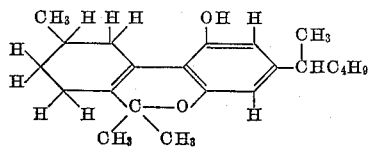

Steps A and B 2-(3,5-dimethoxyphenyl)-2-hexene.—Twenty-two and three tenths grams of 3,5-dimethoxyphenyl n-butyl ketone, 2.43 g. of magnesium and 14.2 g. of methyl iodide were treated according to Example I, Steps A and B. The product boiled at 138–140° (2.5 mm.) and was a straw colored liquid, $n_D^{25}$ 1.5301. The yield was 19.2 g. or 87%.

Step C 2-(3, 5-dimethoxyphenyl)-hexane.—Nineteen and two tenths grams of the above hexene when treated according to Example I, Step C, gave 14.5 g. of hexane (75% yield). It boiled at 126–129° (2.5 mm.) and was a colorless liquid, $n_D^{25}$ 1.5021, $d_4^{25}$ 0.9707.

Step D

5 - (1 - methylpentyl) - resorcinol.—Fourteen grams of the above hexane when treated according to Example I, Step D, gave 10 g. of yellow syrup, B. P. 164–169° (2 mm.), 79% yield.

Step E 1-hydroxy-3-(1-methylpentyl)-9-methyl-7, 8, 9, 10-tetrahydro-6-dibenzopyrone.—Nine and five tenths grams of the above resorcinol, 10 g. of ethyl 5-methylcyclohexanone-2-carboxylate, and 7.5 g. of phosphorus oxychloride in 50 cc. of benzene were treated according to Example I, Step E, and produced white prisms, M. P. 158–159° (corr.) Yield 8.2 g. (53%).

Step F 1-hydroxy-3-(1-methylpentyl)-6, 6, 9-trimethyl-7, 8, 9, 10-tetrahydro-6-dibenzopyran.—Eight and seven one-hundredths grams of the above pyrone, 7.48 g. of magnesium and 44 g. of methyl iodide when treated according to Example I, Step F, gave 5.9 g. of brownish yellow resin, or 70%. It boiled at 173–181° (<1 mm.).

EXAMPLE III

1 - HYDROXY - 3 - (1-N-PROPYLPENTYL) -6,6,9 - TRIMETHYL-7,8,9,10-TETRAHYDRO-6-DIBENZOPYRAN

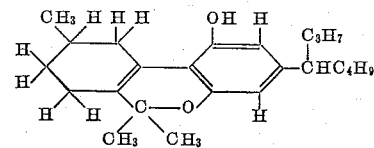

Steps A and B 4-(3,5-dimethoxyphenyl)-3 or 4-octene.—Fifteen grams of 3,5-dimethoxyphenyl n-butyl ketone, 2.43 g. of magnesium and 12.3 g. of n-propyl bromide were treated according to Example I, Steps A and B. The product boiled at 150–153° (3 mm.), and was a colorless liquid, $n_D^{25}$ 1.5185. The yield was 12.2 g. or 73%.

Step C

4 - (3,5 - dimethoxyphenyl) - octane.—Sixteen grams of the above octene when treated according to Example I, Step C, gave 10.5 g. of a colorless liquid, B. P. 137–142° (2.5 mm.), $n_D^{25}$ 1.4998, $d_4^{25}$ 0.9551.

Step D 5-(1-n-propylpentyl)-resorcinol.—Ten grams of the above octane when treated according to Example I, Step D, gave 5.5 g. or 62%. It boiled at 176–178° (2.5 mm.) and was a yellow syrup.

Step E

1 - hydroxy - 3 - (1 - n - propylpentyl) - 9 - methyl - 7,8,9,10 - tetrahydro -6-dibenzopyrone.—Five and three tenths grams of the above resorcinol, 5 g. of ethyl 5-methylcyclohexanone-2-carboxylate, and 4.2 g. of phosphorus oxychloride when treated according to Example I, Step E, gave 4.2 g. or 51% of white prisms, M. P. 162.5–163.5° (corr.).

Step F

*1 - hydroxy - 3 - (1 - n - propylpentyl) - 6,6,9 - trimethyl - 7,9,8,10 - tetrahydro - 6 - dibenzopyran.*—Four and fifteen one-hundredths grams of the above pyrone, 3.53 g. of magnesium and 20.6 g. of methyl iodide when treated according to Example I, Step F, gave 2.6 g. of brownish yellow resin, B. P. 211–214° (2 mm.).

EXAMPLE IV

1 - HYDROXY - 3 - (1 - METHYLBUTYL) - 6,6,9 - TRIMETHYL-7,8,9,10-TETRAHYDRO-6-DIBENZOPYRAN

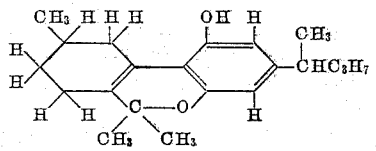

Steps A and B

*2 - (3,5 - dimethoxyphenyl) - 2 - pentene.*—Prepared as in Example I, Steps A and B from 21.1 g. (0.101 moles) of 3,5-dimethoxyphenyl n-propyl ketone and 0.101 moles of methyl magnesium iodide (from 2.45 g. of magnesium and 14.5 g. of methyl iodide). The product boiled at 124–129° (2.3 mm.), and was a straw-colored liquid, $n_D^{25}$ 1.5343, $d_4^{25}$ 1.0086. The yield was 16.4 g. or 79%.

Step C

*2 - (3,5 - dimethoxyphenyl) - pentane.*—Prepared by hydrogenating the above compound with Raney nickel catalyst at room temperature and 2–3 atm. pressure. It boiled at 114–119° (2.3 mm.), and was a colorless liquid, $n_D^{25}$ 1.5052, $d_4^{25}$ 0.9837. The yield was 13.4 g. from 15.9 g. of starting material, or 83.5%.

Step D

*5-(1-methylbutyl)resorcinol.*—Prepared by demethylating the above pentane (12.07 g.) with 48% hydrobromic acid and glacial acetic acid according to the procedure in Example I, Step D. It boiled at 161–165° (3 mm.), and was a lemon-yellow syrup, yield 7.32 g. or 70%.

Step E

*1 - hydroxy - 3 - (1 - methylbutyl) - 9 - methyl - 7,8,9,10-tetrahydro-6-dibenzopyrone.*—A solution of 5.9 g. (0.033 mole) of 5-(1-methylbutyl)-resorcinol, 6.1 g. (0.033 mole) of ethyl 5-methylcyclohexanone-2-carboxylate and 3.1 cc. (0.033 mole) of phosphorus oxychloride in 40 cc. of anhydrous benzene was warmed on a steam-cone for five minutes. The solution was left to stand at room temperature for twenty-one hours, protected from moisture by a calcium chloride tube. The pyrone was isolated and purified as in Example I, Step E. From ethyl acetate it crystallized as white plates, M. P. 181–181.5° (corr.); Yield, 7 g. or 70%.

Step F

*1 - hydroxy - 3 - (1 - methylbutyl) - 6,6,9 - tri - methyl - 7,8,9,10 - tetrahydro - 6 - dibenzopyran.*—Prepared according to procedure in Example I, Step F from 6.78 g. (0.023 mole) of the above pyrone and twelve times the molecular quantity of methylmagnesium iodide. Brown resin, B. P. 201–204.5° (3 mm.); Yield, 5.17 g. or 73%.

EXAMPLE V

1 - HYDROXY - 3 - (1 - ETHYLBUTYL) - 6,6,9 - TRIMETHYL-7,8,9,10-TETRAHYDRO-6-DIBENZOPYRAN

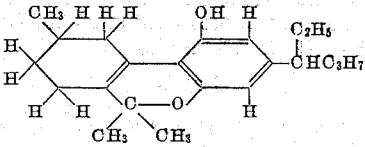

Steps A and B

*3-(3,5-dimethoxyphenyl)-2 or 3-hexene.*—Prepared according to procedure in Example I, Steps A and B, from 20.8 g. (0.10 moles) of 3,5-dimethoxyphenyl n-propyl ketone and 0.10 mole of ethylmagnesium bromide (2.43 g. of magnesium and 10.9 g. of ethtyl bromide). It boiled at 136–140° and was a colorless liquid, $n_D^{25}$ 1.5283, yield 17.6 g. or 80%.

Step C

*3-(3,5-dimethoxyphenyl)-hexane.*—This compound was prepared by hydrogenation according to procedure of Example I, Step C. It boiled at 123–126.5° (2.2 mm.), and was a colorless liquid, $n_D^{25}$ 1.5036, $d_4^{25}$ 0.9766, yield 13 g. from 16.96 g. of the above hexene or 76%.

Step D

*5-(1-ethylbutyl)-resorcinol.*—Prepared by demethylating the above hexane according to procedure of Example I, Step D. It boiled at 163–166° (3 mm.), and was a golden yellow resin, yield 7.2 g. from 12.1 g. of the above hexane or 68%.

Step E

*1 - hydroxy - 3 - (1 - ethtylbutyl) - 9-methyl-7,8,9,10-tetrahydro-6-dibenzopyrone.*—Prepared according to procedure in Example III, Step E, from 6.54 g. (0.034 mole) of 5-(1-ethylbutyl)-resorcinol, 6.33 g. (0.034 mole) of ethyl 5-methyl-cyclohexanone-2-carboxylate and 3.5 cc. (0.034 mole) of phosphorus oxychloride in 40 cc. of anhydrous benzene. The reaction mixture was allowed to stand for eighteen hours, isolated and purified in the usual manner. From ethyl acetate, it crystallized as white prisms; M. P. 195.5–196° C. (corr.), yield, 7.83 g. or 73%.

Step F

*1-hydroxy-3-(1-ethylbutyl) - 6,6,9 - trimethyl-7,8,9,10 - tetrahydro-6-dibenzopyran.*—Prepared according to procedure in Example I, Step F, from 7.62 g. of the above pyrone and twelve times the molecular quantity of methylmagnesium iodide, isolated and purified in usual manner. It boiled at 211–213° (3.5 mm.), and was a purple resin, yield, 6 g. or 76%.

EXAMPLE VI

1-HYDROXY - 3 - (1 - METHYLHEPTYL) - 6,6,9 - TRIMETHYL-7,8,9,10-TETRAHYDRO-6-DIBENZOPYRAN

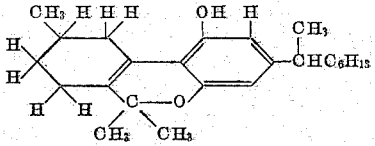

Steps A and B

*2-(3,5-dimethoxyphenyl) - 2 - octene.*—Treatment of 3,5-dimethoxyphenyl-n-hexyl ketone by methods analogous to Example I, steps A and B, yielded a product boiling at 163–169° (4 mm.); $n_D^{25}$ 1.5215.

Step C

2 - (3,5 - dimethoxyphenyl) -n-octane.—Treatment of 2-(3,5-dimethoxyphenyl)-n-octene according to the method disclosed in Example 1, step C yielded a product boiling at 150–153° (3.5 mm.); $n_D^{25}$ 1.4988; $d_4^{25}$ 0.9605.

Step D 5-(1-methylheptyl)-resorcinol.—Treatment of 2-(3,5-dimethoxyphenyl)-n-octane according to the method described in Example I step D yielded a product boiling at 178–184° (4 mm.)

Step E

1 - hydroxy - 3 - (1 - methylheptyl) -9-methyl-7,8,9,10 - tetrahydro - 6-dibenzopyrone.—According to the method described in Example I, step E yielded a white crystalline product melting at 132.5–134°.

Step F 1-hydroxy-3-(1-methylheptyl) - 6,6,9-trimethyl-7,8,9,10-tetrahydro - 6 - dibenzopyran.—Treatment of the above pyrone according to the method described in Example I, step F yielded a product boiling at 217–222° (2.5 mm.).

EXAMPLE VII

ACYLATED PRODUCTS

The hydroxyl group present in the one position in any of the products of the preceding or following examples may be changed to acetyl by heating with acetic anhydride and a little fused anhydrous sodium acetate for about two hours. The excess reagent may be removed in conventional ways, as by mixing the mass with ice water, neutralizing with sodium bicarbonate and extracting with ether to secure the desired product. Other acyl groups may be substituted by using the appropriate acid anhydride and sodium salt.

EXAMPLE VIII

ETHERIFICATION

The hydroxyl group present in the one position of any of the dibenzopyrans of the preceding or following examples may be converted to an alkoxy group. This is done by refluxing for about fifteen hours with anhydrous potassium carbonate and the desired alkyl halide in acetone solution. In the case of forming a monomethyl ether, the product may be purified by dissolving unchanged tetrahydrocannabinol with Claisen's potash.

EXAMPLE IX

HEXAHYDRO COMPOUNDS

Any of the tetrahydrodibenzopyrans may be reduced to the corresponding hexahydro compounds. This may be done by dissolving the tetrahydro compound in from fifteen to twenty-five times its weight of glacial acetic acid, using a small amount of platinum oxide as a catalyst, and subjecting the mass to the action of gaseous hydrogen at room temperature and 20–60 pounds pressure until one mole equivalent of hydrogen has been absorbed. After absorption is complete the solution may be filtered and the acetic acid removed by vacuum distillation.

EXAMPLE X

DIBENZOPYRAN FROM PULEGONE

It will be obvious in place of the ethyl 5-methylcyclohexanone-2-carboxylate, pulegone may be used as starting material. For instance, about 1 mole of pulegone, 1 mole of 5-(1-methylbutyl)-resorcinol, and 0.33 mole of phosphorus oxychloride in dry benzene are refluxed for about four hours. The reaction mixture is then poured into an excess of aqueous sodium bicarbonate and warmed on a steam bath until the phosphorus derivatives are decomposed. After cooling, the benzene layer is separated and the aqueous layer extracted with a mixture of benzene and ether. The solutions of the desired product in the organic solvents are then combined, extracted with 2 percent aqueous sodium hydroxide and the solvent removed in the usual manner. The residue when distilled under a pressure of 2 mm. boils at 175–187°.

Without further elaboration the foregoing will so fully explain my invention that others may readily adapt the same for use under various conditions of service.

I claim:

1. The compound 1 - hydroxy - 3 - (1 - methylhexyl) -6,6,9-trimethyl - 7,8,9,10 - tetrahydro - 6 - dibenzopyran represented by the formula:

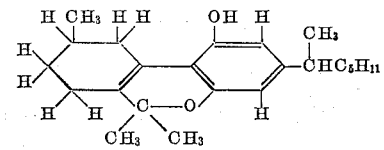

2. The compound 1 - hydroxy - 3 - (1 - methylpentyl) -6,6,9-trimethyl-7,8,9,10-tetrahydro - 6 - dibenzopyran represented by the formula:

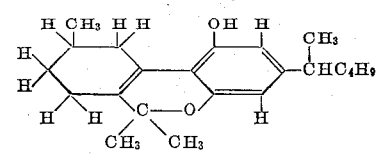

3. The compound 1 - hydroxy - 3 - (1 - methylheptyl) -6,6,9-trimethyl-7,8,9,10 - tetrahydro - 6 - dibenzopyran represented by the formula:

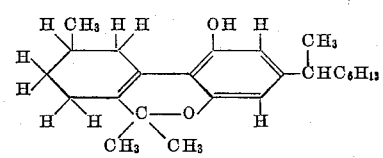

4. The method of preparing therapeutic compounds which comprises producing a 3,5-dimethoxy - 1 - sec - alkylbenzene having the secondary alkyl branches in the 1 - position of the alkyl chain; demethylating said compound to a substituted resorcinol; condensing said resorcinol with an alkyl 5-methylcyclohexanone-2-carboxylate to form the corresponding dibenzopyrone; and methylating the pyrone ring to form the corresponding dimethyl pyran.

5. As therapeutic compounds having marihuana activity, tetrahydrodibenzopyrans represented by the following formula

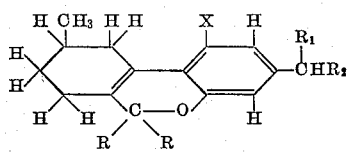

where R, $R_1$ and $R_2$ represent lower alkyl groups and X represents a member selected from the group consisting of hydroxy, acyloxy and alkoxy groups.

6. A compound in accordance with claim 5 in which R represents a methyl group and X an hydroxy group.

7. A compound in accordance with claim 5 in which R represents a methyl group, X an hydroxy group, and $R_1$ represents a methyl group and $R_2$ represents an alkyl group having not more than seven carbon atoms.

8. The compound, 1-hydroxy-3-(1-n-propylpentyl)-6,6,9-trimethyl-7,8,9,10-tetrahydro - 6 - dibenzopyran.

9. The compound, 1 - hydroxy - 3 - (1-methylbutyl)-6,6,9-trimethyl - 7,8,9,10 - tetrahydro - 6 - dibenzopyran.

ROGER ADAMS.

REFERENCES CITED

The following references are of record in the file of this patent:

UNITED STATES PATENTS

| Number | Name | Date |
|---|---|---|
| 2,030,423 | Austin | Feb. 11, 1936 |
| 2,378,698 | Gibbs | June 19, 1945 |
| 2,419,935 | Adams | May 6, 1947 |

OTHER REFERENCES

P. B. Russel et al., J. Chem. Soc. (London) pages 826–829, December, 1941.

Blatt, J. Wash. Acad. of Sciences 28, 465-477 (1938).